(12) United States Patent
Schoon

(10) Patent No.: US 8,323,143 B2
(45) Date of Patent: Dec. 4, 2012

(54) INTEGRATED SPINDLE-CARRIER ELECTRIC WHEEL DRIVE

(75) Inventor: Benjamin Warren Schoon, Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 445 days.

(21) Appl. No.: 12/629,204

(22) Filed: Dec. 2, 2009

(65) Prior Publication Data

US 2011/0130238 A1    Jun. 2, 2011

(51) Int. Cl.
F16H 57/08 (2006.01)

(52) U.S. Cl. ......... 475/337; 475/154; 475/330; 475/346

(58) Field of Classification Search .............. 475/5, 149, 475/154, 157, 221, 248, 330, 337, 339, 346
See application file for complete search history.

(56) References Cited

U.S. PATENT DOCUMENTS

| | | | |
|---|---|---|---|
| 1,570,356 A | 1/1926 | Lane | |
| 3,214,989 A | 11/1965 | Wellauer et al. | |
| 3,737,000 A * | 6/1973 | Knobloch et al. | 180/369 |
| 3,767,013 A | 10/1973 | Caldwell | |
| 3,848,702 A | 11/1974 | Bergman | |
| 4,018,097 A | 4/1977 | Ross | |
| 4,031,780 A | 6/1977 | Dolan et al. | |
| 4,050,544 A | 9/1977 | Kalyan et al. | |
| 4,051,922 A | 10/1977 | Sukle | |
| 4,057,126 A | 11/1977 | Stephens | |
| 4,090,588 A | 5/1978 | Willover | |
| 4,121,694 A | 10/1978 | Nelson | |
| 4,170,549 A | 10/1979 | Johnson | |
| 4,221,279 A | 9/1980 | Jones et al. | |
| 4,222,283 A | 9/1980 | Nagy | |
| 4,327,950 A | 5/1982 | Czuszak | |
| 4,359,142 A | 11/1982 | Schultz et al. | |
| 4,361,774 A | 11/1982 | Czech | |
| 4,448,552 A | 5/1984 | White et al. | |
| 4,545,332 A | 10/1985 | Suzuki et al. | |

(Continued)

FOREIGN PATENT DOCUMENTS

DE    29616087 D1    11/1996

(Continued)

OTHER PUBLICATIONS

Schoon, PCT/US2008/056337, International Search Report, Jun. 9, 2009.

(Continued)

Primary Examiner — Justin Holmes
(74) Attorney, Agent, or Firm — Woodling, Krost and Rust

(57) ABSTRACT

A wheel drive assembly includes a rotatable spindle-carrier affixed to a wheel. A fixed housing includes an output ring gear and the spindle-carrier resides generally within the housing. An output sun gear driven by an input carrier drives output planetary gears which, in turn, interengage the output ring gear driving and rotating the spindle-carrier. A fixed drive end housing includes an input ring gear and houses a noise reducing radially floating input carrier and a plurality of input planet gears rotatably mounted in the input carrier. The input sun gear is driven by an electric motor and drives the plurality of input planet gears which mesh with the input ring gear causing rotation of the input carrier about its true center. The input carrier is partially nested within the spindle-carrier and the motor is partially nested within the fixed drive end housing.

30 Claims, 11 Drawing Sheets

U.S. PATENT DOCUMENTS

| | | |
|---|---|---|
| 4,575,311 A | 3/1986 | Wood |
| 4,588,385 A | 5/1986 | Suzuki et al. |
| 4,616,736 A | 10/1986 | Fox |
| 4,683,771 A | 8/1987 | Sogo et al. |
| 4,683,985 A | 8/1987 | Hultgren |
| 4,700,808 A | 10/1987 | Haentjens |
| 4,705,449 A | 11/1987 | Christianson et al. |
| 4,741,303 A | 5/1988 | Kronich |
| 4,762,471 A | 8/1988 | Asanuma et al. |
| 4,763,031 A | 8/1988 | Wang |
| 4,766,859 A | 8/1988 | Miyaki et al. |
| 4,803,897 A | 2/1989 | Reed |
| 4,930,590 A | 6/1990 | Love |
| 4,952,077 A | 8/1990 | Kurt |
| 4,987,974 A | 1/1991 | Crouch |
| 5,024,636 A | 6/1991 | Phebus et al. |
| 5,161,644 A | 11/1992 | Swenskowski et al. |
| 5,333,704 A | 8/1994 | Hoff |
| 5,340,273 A | 8/1994 | Rockwood |
| 5,453,181 A | 9/1995 | Dahlback et al. |
| 5,472,059 A * | 12/1995 | Schlosser et al. .......... 180/65.51 |
| 5,478,290 A | 12/1995 | Buuck et al. |
| 5,480,003 A | 1/1996 | Hill et al. |
| 5,489,013 A | 2/1996 | Buuck et al. |
| 5,505,112 A | 4/1996 | Gee |
| 5,558,180 A | 9/1996 | Yanagisawa |
| 5,591,018 A | 1/1997 | Takeuchi et al. |
| 5,601,155 A | 2/1997 | Gardner |
| 5,616,097 A | 4/1997 | Dammon |
| 5,630,481 A | 5/1997 | Rivard |
| 5,634,530 A | 6/1997 | Maekawa et al. |
| 5,662,188 A | 9/1997 | Ito et al. |
| 5,667,036 A | 9/1997 | Mueller et al. |
| 5,699,877 A | 12/1997 | Freier |
| 5,725,072 A | 3/1998 | Yamamoto |
| 5,768,954 A | 6/1998 | Grabherr et al. |
| 5,810,116 A | 9/1998 | Kaptrosky |
| 5,860,403 A | 1/1999 | Hirano et al. |
| 5,887,678 A | 3/1999 | Lavender |
| 5,947,075 A | 9/1999 | Ryu et al. |
| 6,106,254 A | 8/2000 | Hirooka et al. |
| 6,139,295 A | 10/2000 | Utter et al. |
| 6,146,118 A | 11/2000 | Haller et al. |
| 6,213,078 B1 | 4/2001 | Ryu et al. |
| 6,213,081 B1 | 4/2001 | Ryu et al. |
| 6,223,858 B1 | 5/2001 | Ubagai et al. |
| 6,244,386 B1 | 6/2001 | Takasaki et al. |
| 6,327,994 B1 | 12/2001 | Labrador |
| 6,328,123 B1 * | 12/2001 | Niemann et al. .......... 180/65.51 |
| 6,374,951 B1 | 4/2002 | Michelhaugh |
| 6,394,061 B2 | 5/2002 | Ryu et al. |
| 6,439,208 B1 | 8/2002 | Jones |
| 6,488,110 B2 | 12/2002 | Price |
| 6,516,789 B1 | 2/2003 | Jones |
| 6,588,539 B2 | 7/2003 | Hinton et al. |
| 6,616,432 B2 | 9/2003 | Sczcepanski et al. |
| 6,616,567 B2 | 9/2003 | Strong et al. |
| 6,698,762 B2 | 3/2004 | Newberg et al. |
| 6,705,555 B1 | 3/2004 | Bratten |
| 6,810,849 B1 | 11/2004 | Hirsch et al. |
| 6,852,061 B2 | 2/2005 | Schoon |
| 6,863,043 B2 | 3/2005 | Kurihara et al. |
| 6,964,313 B2 | 11/2005 | Phillips, III et al. |
| 7,243,749 B2 | 7/2007 | Kakinami et al. |
| 7,455,616 B2 | 11/2008 | Beltkowski |
| 7,622,836 B2 | 11/2009 | DeVeny et al. |
| 2003/0032516 A1 | 2/2003 | Gervais, III |
| 2003/0037737 A1 | 2/2003 | Artola |
| 2004/0087405 A1 | 5/2004 | Inoue et al. |
| 2004/0235606 A1 | 11/2004 | Brossard |
| 2005/0032602 A1 | 2/2005 | Wagle |
| 2005/0176545 A1 | 8/2005 | Miller et al. |
| 2005/0178893 A1 | 8/2005 | Miller et al. |
| 2005/0272551 A1 | 12/2005 | Oates |
| 2007/0295557 A1 | 12/2007 | Aldridge |
| 2008/0230284 A1 | 9/2008 | Schoon |
| 2008/0230289 A1 | 9/2008 | Schoon et al. |
| 2009/0032321 A1 | 2/2009 | Marsch |

FOREIGN PATENT DOCUMENTS

| | | |
|---|---|---|
| JP | 60157593 A | 8/1985 |

OTHER PUBLICATIONS

Schoon, PCT/US2008/056337, Written Opinion of the International Searching Authority, Jun. 9, 2009.

U.S. Appl. No. 12/255,292, filed Oct. 21, 2008, inventor, Benjamin Warren Schoon, entire document; claiming priority to U.S. Appl. No. 61/097,456, filed Sep. 16, 2008, inventor, Benjamin Warren Schoon, entire document; and claiming priority to U.S. Appl. No. 61/073,021, filed Jun. 16, 2008, Benjamin Warren Schoon, entire document.

U.S. Appl. No. 61/097,456, filed Sep. 16, 2008, Schoon, Entire Document.

U.S. Appl. No. 61/073,021, filed Jun. 16, 2008, Schoon, Entire Document.

General Electric EV-1 B, C, D, Manual.

Imperial Electric Offset Gearbox Frame 56.

U.S. Appl. No. 12/255,292, filed Oct. 21, 2008, Gear Reducer Electric Motor Assembly With Internal Brake, Inventor Benjamin Warren Schoon.

European Patent Office Extended Search Report, Dec. 6, 2010, Serial No. 10163630.6, Applicant Fairfield Manufacturing Company, Inc.

European Search Report, EP 1 843 056 A3, Application No. EP 06 01 9821, Dec. 12, 2008 Munich, 8307.

Canadian Intellectual Property Office, Aug. 16, 2012, Patent Application No. 2,704,501, Fairfield Manufacturing Company, Inc., Integrated Spindle-Carrier Electric Wheel Drive, Requisition by the Examiner in Accordance With Subsection 30(2) of the Patent Rules.

* cited by examiner

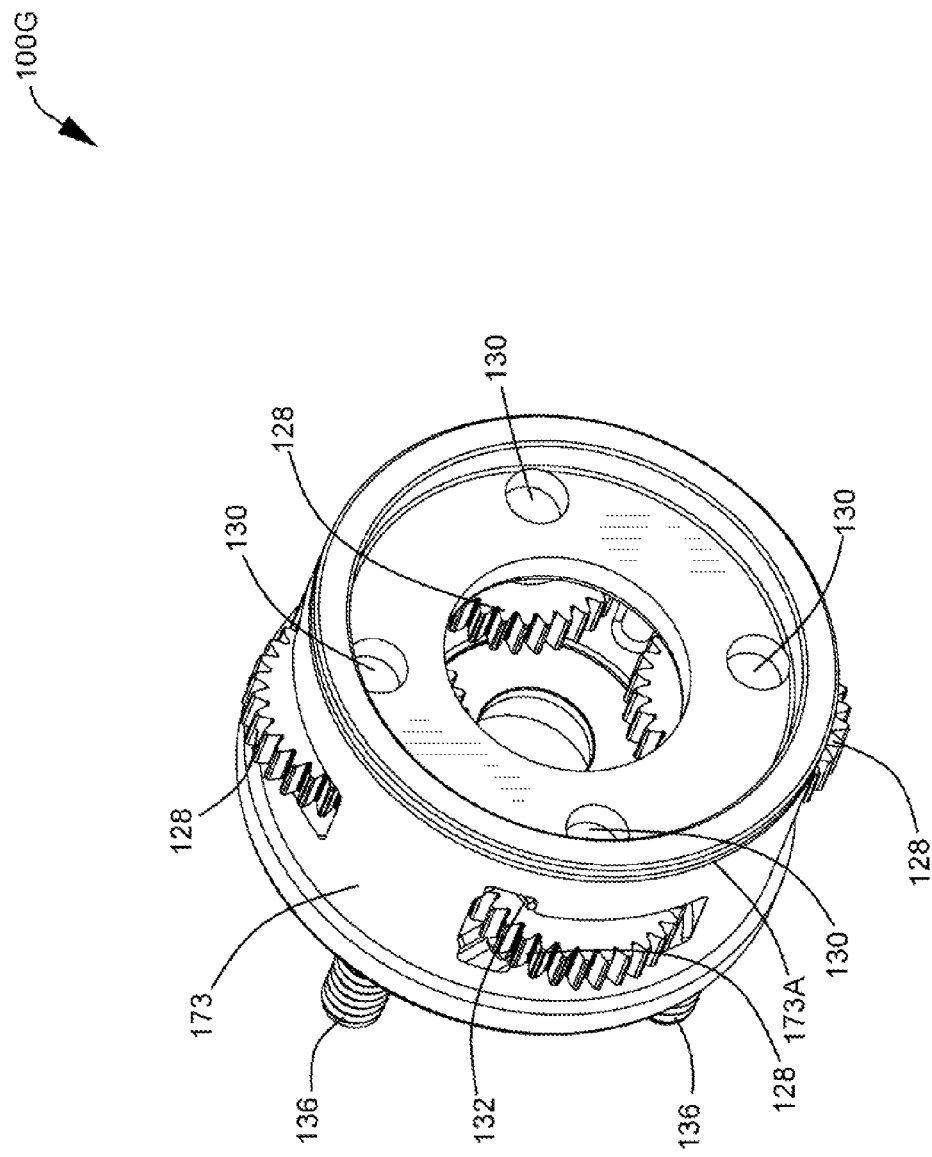

INTEGRATED SPINDLE-CARRIER ELECTRIC WHEEL DRIVE

FIELD OF THE INVENTION

The invention is in the field of compact electric wheel drive assemblies for relatively light, medium speed vehicles.

BACKGROUND OF THE INVENTION

U.S. Pat. No. 7,455,616 to Beltkowski is a carrier output device. The device contains a spindle which is usually defined as the shaft type part that supports the inner raceways of the main bearings. It is the shaft part that the tapered bearing cone sits on. The '616 patent is a hub output device. The spindle is fixed to the machine frame and the entire housing rotates around the spindle. The wheel is connected to the housing.

U.S. Pat. No. 6,852,061 to Schoon, the inventor of the instant application, states, in the Abstract, as follows: "A new, useful and compact wheel motor drive arrangement for applications on such construction equipment as scissor lifts and other similar scaffolding equipment where hydraulically driven systems have historically been used to provide power to the wheels to move the equipment is disclosed. An electric motor is mounted to a spindle bracket which is pivotably connected to the frame of the equipment to allow the unit to be pivoted around a vertical axis for steering purposes. A gear reducing planetary gear system is mounted around the drive shaft of the motor is (sic) positioned totally within the rotating wheel hub. The output ring gear of the planetary gear system is integrally formed to the interior of the wheel hub so that there is a direct application through the planetary gear system to the wheel hub to provide greater efficiency."

There is a need for clean, environmentally green, compact electric wheel drive assemblies for relatively light, medium speed vehicles. Some example applications are zero-turn lawn mowers, utility vehicles, and sweepers. Currently non-axle vehicles are driven with low speed hydraulic motors which are directly connected to the wheels. Hydraulic systems have many undesirable features such as noise, leaks, and relatively poor efficiency.

SUMMARY OF THE INVENTION

A compact wheel drive assembly includes an electric motor rotatably driving an input sun gear. A fixed drive end housing is bolted to the motor housing and includes an input ring gear, an input carrier and a plurality of input planet gears rotatably mounted to the input carrier. An input sun gear drives the plurality of input planet gears which meshing with the input ring gear causing rotation of the input carrier. An output sun gear is driven by the input carrier. A fixed spindle-carrier housing includes an output ring gear located on the interior thereof. A spindle-carrier and a plurality of output planet gears rotatably mounted thereto reside within the fixed spindle-carrier housing. Two bearings reside between the spindle-carrier and the fixed spindle-carrier housing. The spindle-carrier functions as a bearing support, wheel mounting, a mounting for the output planet and gears and as a torque multiplier-speed reducer. The spindle-carrier is generally cylindrically shaped having a closed drive end and a partially open input end, the input carrier is partially nested within the partially open input end of the spindle-carrier. The fixed spindle-carrier housing is generally cylindrically shaped.

The output sun gear drives the plurality of output planet gears which mesh with the output ring gear of the fixed spindle-carrier housing causing rotation of the spindle-carrier. A vehicle wheel which supports a vehicle tire is affixed to the spindle-carrier and is rotatable therewith.

The wheel is affixed to and mounted directly on the spindle-carrier. The spindle-carrier includes a least one stud and, preferably, a plurality of studs which protrude from the face of the spindle-carrier. The studs are inserted through a hole or holes in the wheel for attachment of the wheel to the spindle-carrier. Preferably the studs include threads thereon and nuts are threaded onto the studs securing the wheel to the spindle-carrier. Input planet gears mesh with the input sun gear and the input ring gear which allows the input carrier to move radially and adjustably locate its true rotating center thus reducing noise generation under load. A brake is employed to allow the wheel to remain in place, and hence, the vehicle driven by the wheel to remain in place. When the brake is supplied with electrical power the brake is not actuated. When electrical power is withdrawn from the brake, the brake is actuated and the motor shaft is locked to the motor housing which in turn is locked to the vehicle.

Wheel studs are threaded into the carrier. Threaded studs protrude into the carrier walls (webs) between the planet gear openings. The studs are double ended. One end is threaded and cemented into the spindle-carrier with an adhesive and the vehicle wheel is attached to the threaded exposed end utilizing a threaded nut. Other structure may be used for affixing the wheel to the spindle-carrier such as welding, coupling, magnetic attraction, etc.

The motor shaft includes an internal spline and the input sun gear includes teeth which mesh with the internal spline. The input carrier resides partially within the fixed drive end housing and partially within the rotating spindle-carrier and this results in a reduction of the overall length of the wheel drive assembly. The motor (preferably an AC motor) resides partially within the motor housing and partially within the fixed drive end housing which results in a reduction of the overall length of the wheel drive assembly.

The length of the example of the drive assembly illustrated herein is approximately 280 mm (11 inches) long and approximately 154 mm (6 inches) in diameter. With the wheel affixed to the reducer-motor assembly, the example illustrated herein is approximately 373 mm (14.7 inches) long and approximately 234 mm (9.2 inches) in diameter. The wheel itself is approximately 201 inches in length with a diameter of 234 mm (9.2 inches).

The instant invention includes a spindle-carrier output, a fixed spindle-carrier housing is fixed and the wheel is attached to the integrated spindle-carrier. The instant invention combines the functions of the spindle and the functions of the output carrier into a single compact part, namely, the spindle-carrier. Spindle functions of the spindle-carrier include bearing support and wheel mounting. Carrier functions of the spindle-carrier include the mounting and spacing of the planet gears, torque multiplication and speed reduction. Traditionally, these components of a planetary gear reducer, namely, the spindle and the output carrier, are separate and are usually two of the most expensive components in a planetary gearbox. Using this approach, it is possible to eliminate an expensive component as well as significantly reduce the gearbox length. As such, the invention is suited for use in vehicles where space is a consideration.

One of the objects of this invention is to provide a compact electric wheel drive assembly for relatively light, medium speed vehicles. Some example applications are zero-turn lawn mowers, utility vehicles, and sweepers. This invention is particularly suitable where a conventional axle drive cannot be used. Non-axle vehicles are currently driven with low speed hydraulic motors which are directly connected to the wheels. Hydraulic systems have many undesirable features such as noise, leaks, and relatively poor efficiency. Using the wheel drive assembly of the instant invention allows for a compact electric motor, gearbox, and brake assembly to replace the hydraulic motor and provide a quiet, efficient, and hydraulic-free means of transmitting power to the wheels.

It is an object of the invention to provide a spindle-carrier and a fixed spindle-carrier housing wherein a wheel is attached to the integrated spindle-carrier.

It is an object of the invention to provide a compact electric wheel drive assembly for relative light, medium speed vehicles.

It is an object of the invention to utilize a spindle-carrier to perform the functions of a spindle, namely, bearing support and wheel mounting and also to perform the functions of a carrier, namely, mounting and spacing of the planet gears, torque multiplication and speed reduction.

It is an object of the invention to utilize an input sun gear, input planet gears and an input planet carrier not supported by bearings in conjunction with an input ring gear wherein the input planet gears mesh with the input ring gear of the fixed drive end housing causing rotation of the input carrier about its true center.

It is an object of the invention wherein the input ring gear allows the input carrier to move radially and reduce noise generation under load.

It is an object of the invention to partially nest the input planet carrier within the spindle-carrier to reduce the axial length of the compact electric motor gear reducer assembly.

It is an object of the invention to partially nest the electric motor within the drive end housing to reduce the axial length of the compact electric motor gear reducer assembly.

These and other objects of the invention will be best understood when reference is made to the Brief Description of the Drawings and the Description of the Invention which follow hereinbelow.

BRIEF DESCRIPTION OF THE DRAWINGS

FIG. 1G is perspective view of the spindle-carrier 129.

DESCRIPTION OF THE INVENTION

Figure 1:
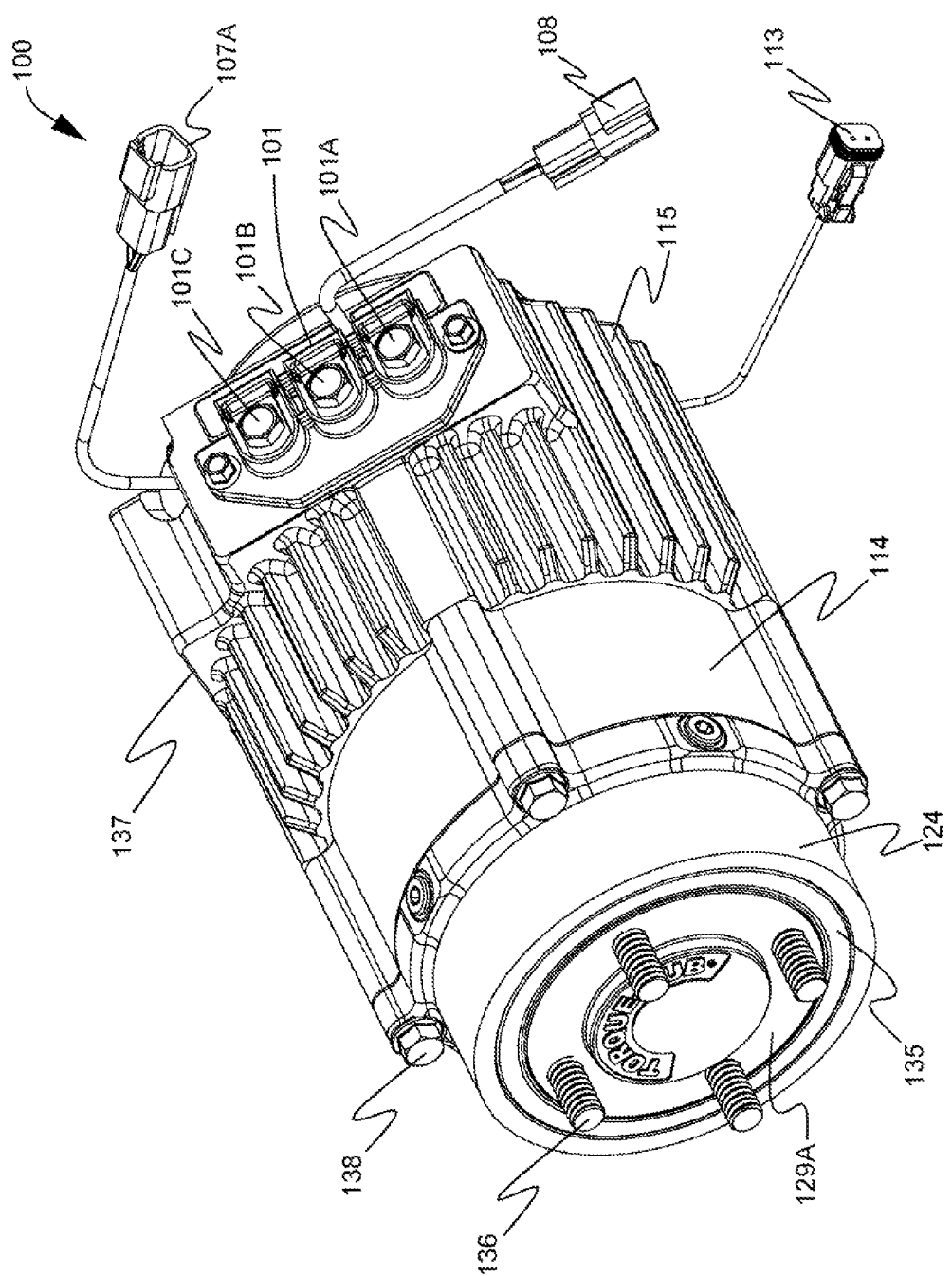
FIG. 1 is a perspective view of the integrated spindle-carrier electric wheel drive assembly.

FIG. 1 is a perspective view 100 of the integrated spindle-carrier 129 electric wheel drive assembly. Referring to FIG. 1, a terminal strip 101 and line terminals 101A, 101B, and 101C are illustrated. FIG. 1 also illustrates a temperature sensor connector 108, a brake connector 113, and a speed sensor connector 107A are also illustrated. Motor housing 115, drive end head 114, and spindle-carrier housing 124 are illustrated connected together with long bolts 138. Motor housing 115 has threaded bores which receive bolts 138. Threaded studs 136 are illustrated extending from the spindle-carrier 129 in web locations thereof. Threaded studs 136 are used to fasten a wheel 180 as illustrated in FIG. 1J. Drive end head 114 houses input sun gear 117, input planet carrier 119, and the input planet gears 118. Reference numeral 137 represents an attachment plate for connection to a pivoting or non-pivoting mechanism interconnected with the vehicle. Attachment plate 137 includes threaded bolt holes therein.

Figure 1A:
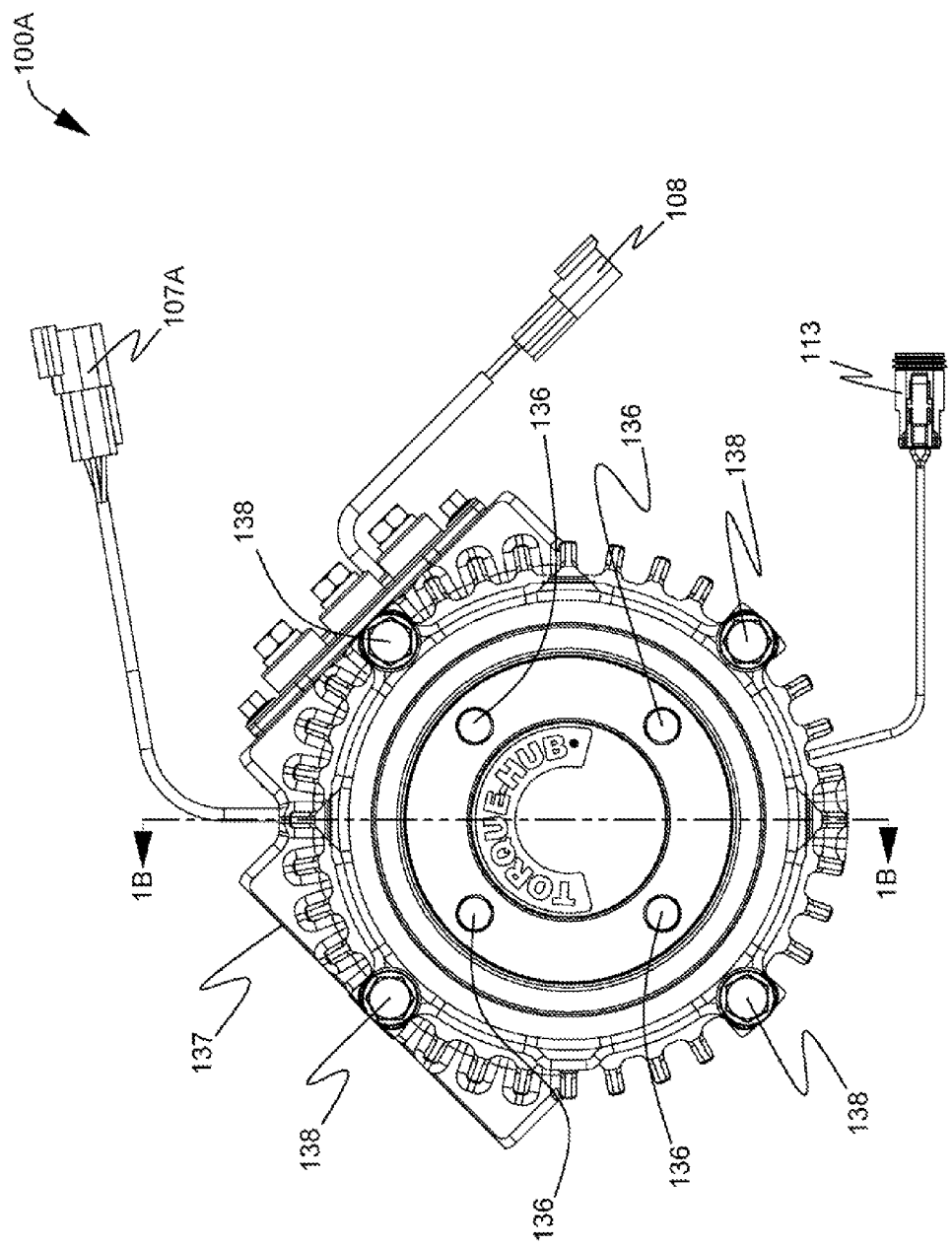
FIG. 1A is an end view of the integrated spindle carrier-electric wheel drive assembly.

FIG. 1A is an end view 100A of the integrated spindle-carrier 129 electric wheel drive assembly illustrating many of the same components illustrated and described in connection with FIG. 1.

Figure 1B:
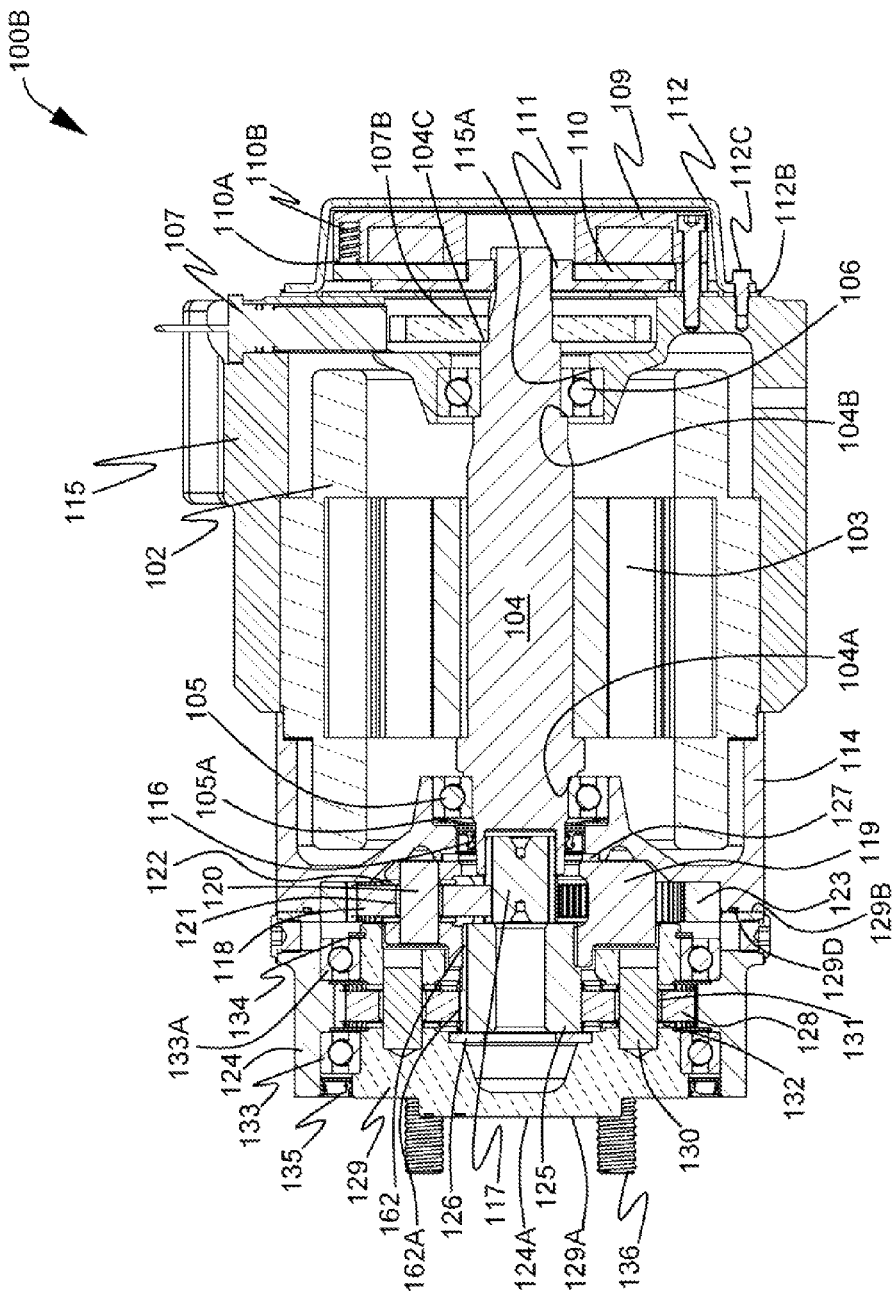
FIG. 1B is a cross-sectional view of the integrated spindle-carrier electric wheel drive assembly taken along the lines 1B-1B of FIG. 1A
Figure 1C:
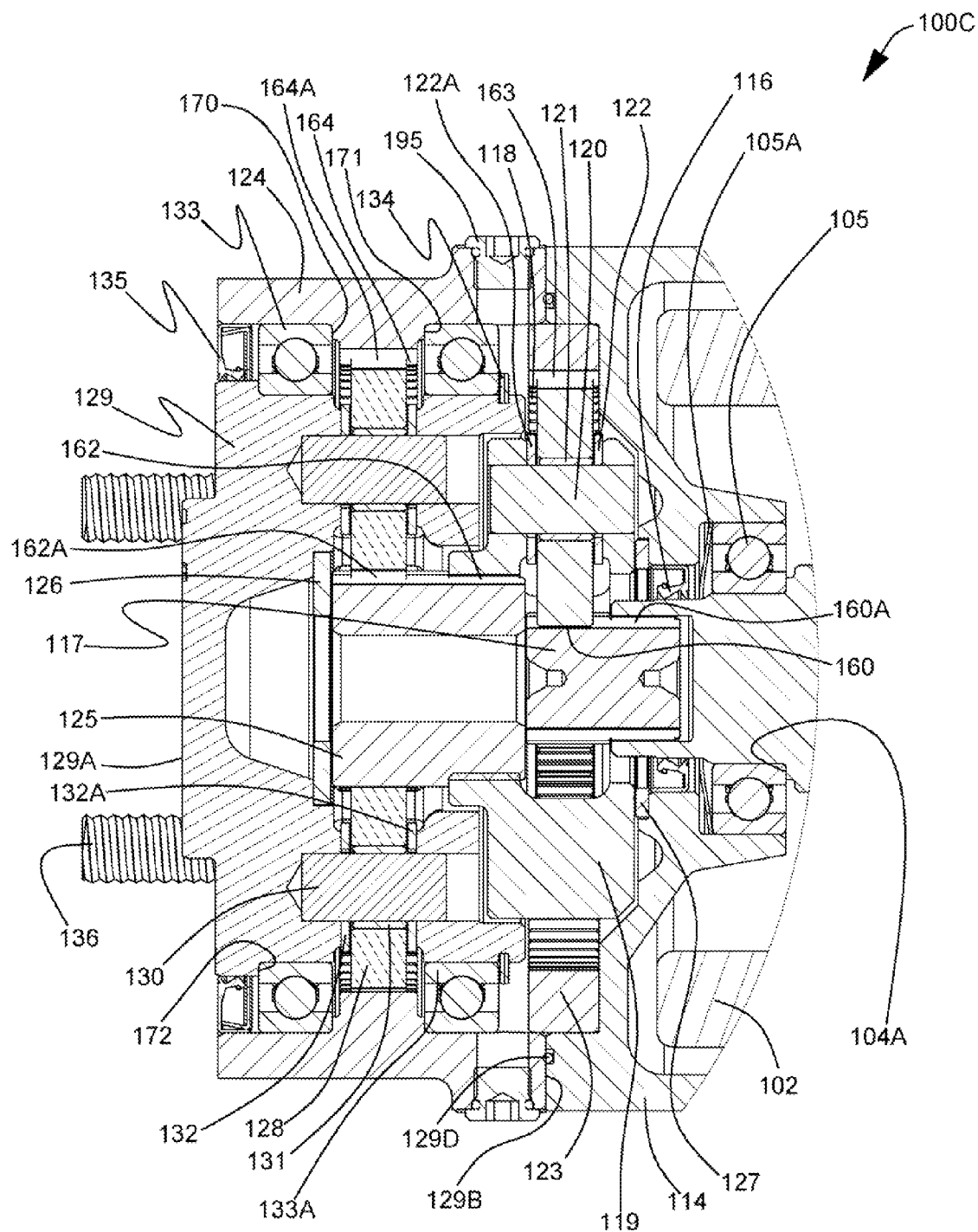
FIG. 1C is an enlargement of a portion of FIG. 1B illustrating the spindle-carrier subassembly, the input carrier, and drive end head.
Figure 1D:
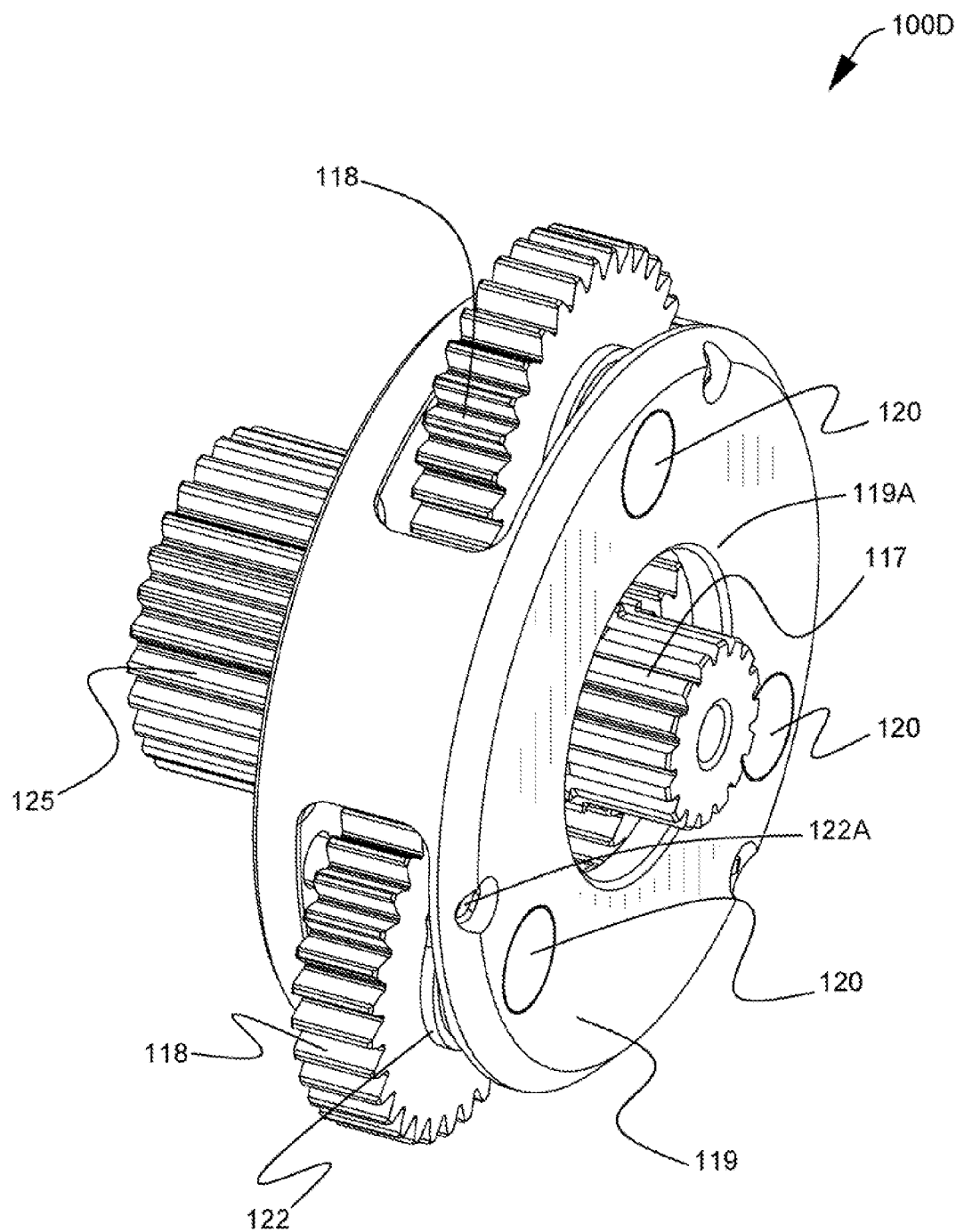
FIG. 1D is a perspective view of the input carrier and the input planet gears.
Figure 1E:
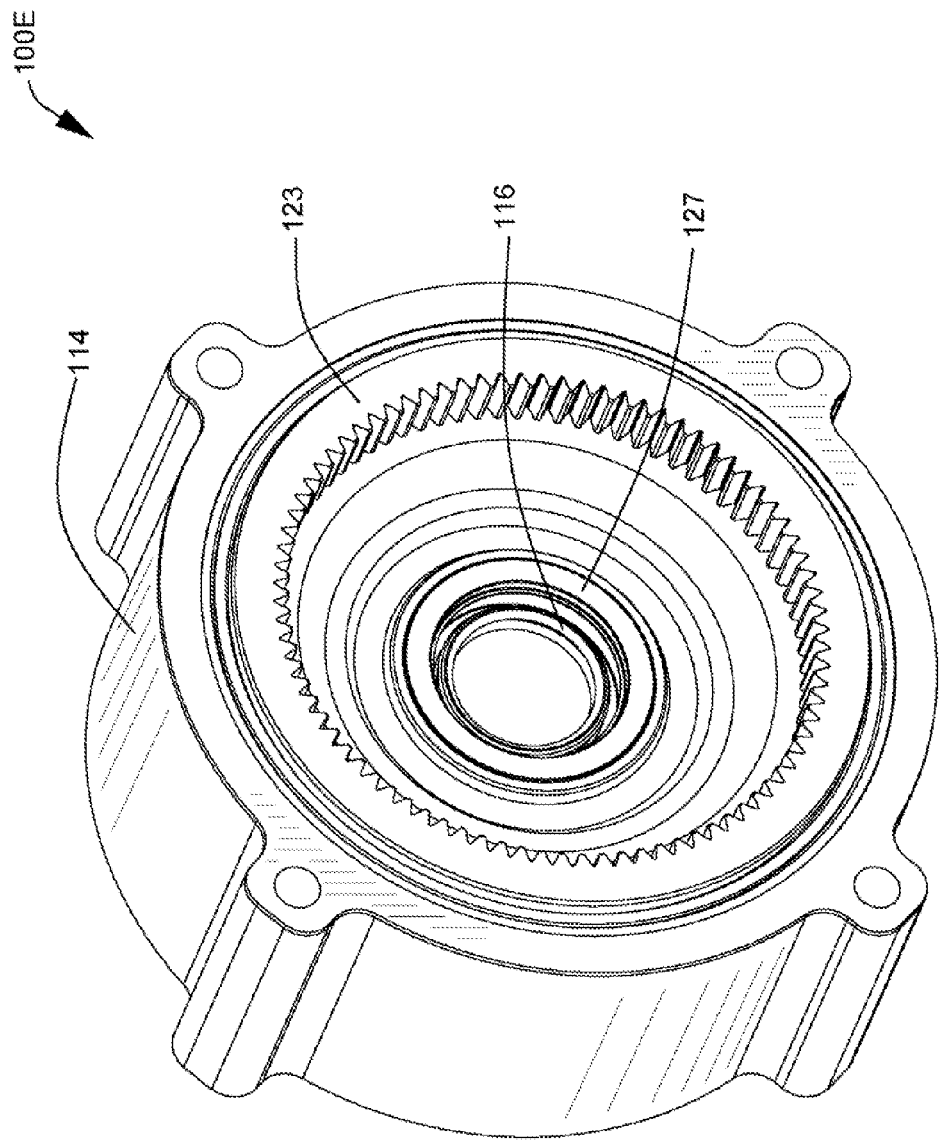
FIG. 1E is a perspective view of the drive end head sub assembly from the gear reducer side.
Figure 1F:
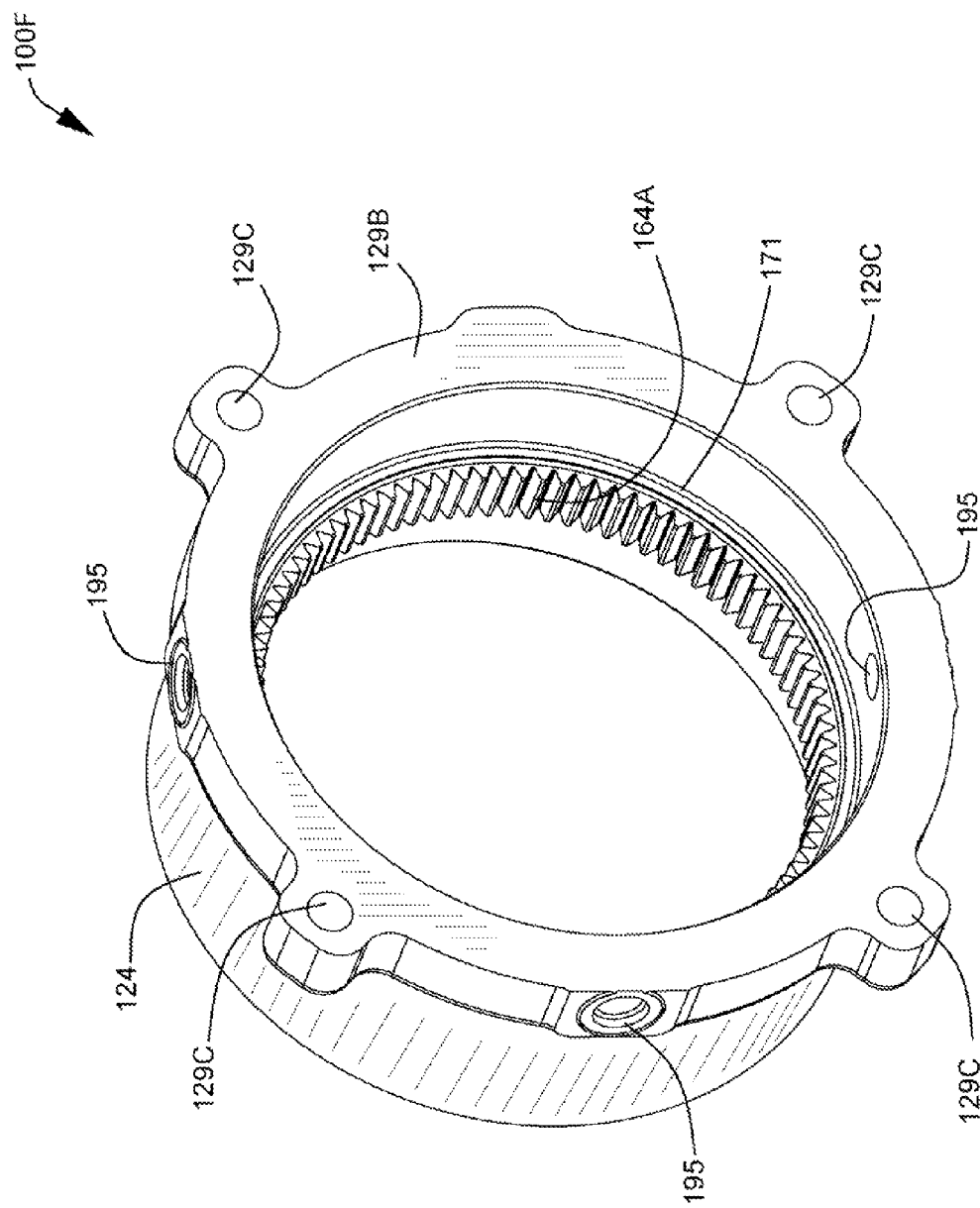
FIG. 1F is a perspective view of the output ring gear of the fixed spindle-carrier housing.

FIG. 1B is a cross-sectional schematic view 100B of the integrated spindle-carrier electric wheel drive assembly taken along the lines 1B-1B of FIG. 1A Motor housing 115 partially envelops the shaft 104, stator winding 102 and rotor 103 of the electric motor. Wiring to the components is not shown so as to better express the structure without cluttering FIG. 1B with wiring structure. A first shoulder 104A and a second shoulder 104B are illustrated in connection with shaft bearings 105 and 106 respectively. First (gear reducer side) shaft support bearing 105 is trapped between shoulder 104A and Belleville spring 105A and second (brake side) shaft support bearing 106 is trapped intermediate shoulder 115A of the motor housing 115 and shaft 104. Reference numeral 135 denotes a seal residing intermediate rotatable spindle-carrier 129 and fixed spindle-carrier housing 124.

Figure 1H:
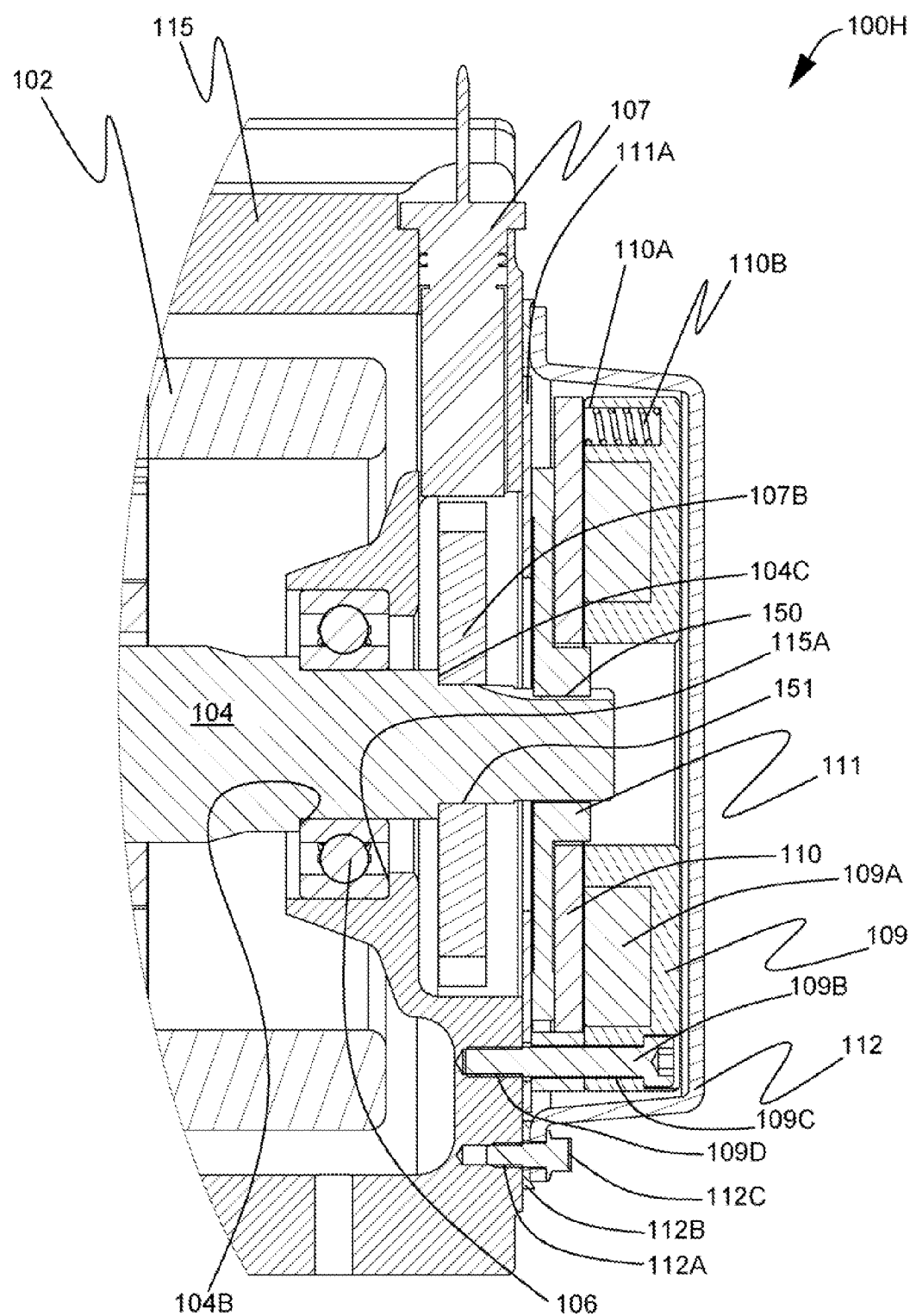
FIG. 1H is an enlargement of a portion of FIG. 1B.
Figure 1I:
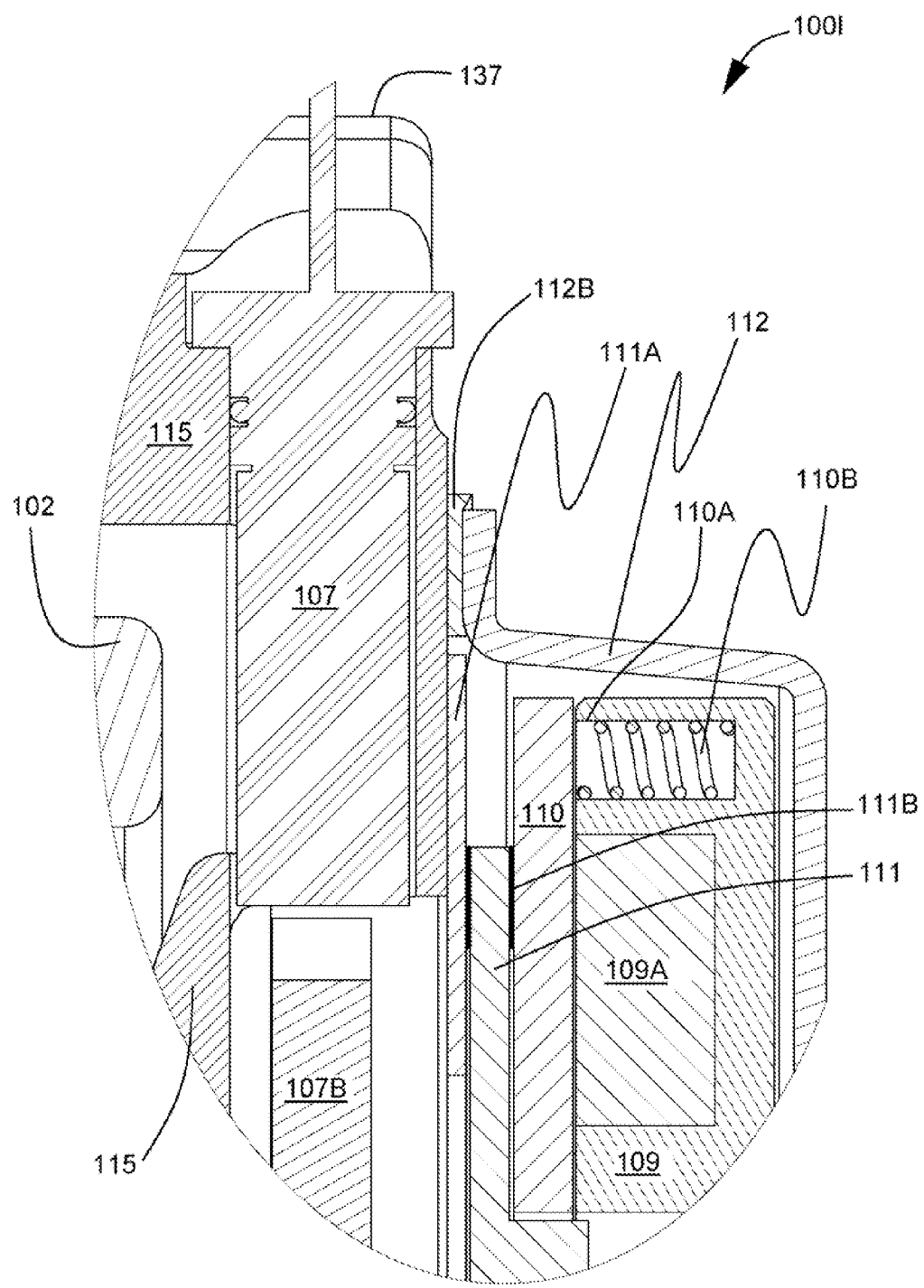
FIG. 1I is an enlargement of a portion of FIG. 1H
Figure 1J:
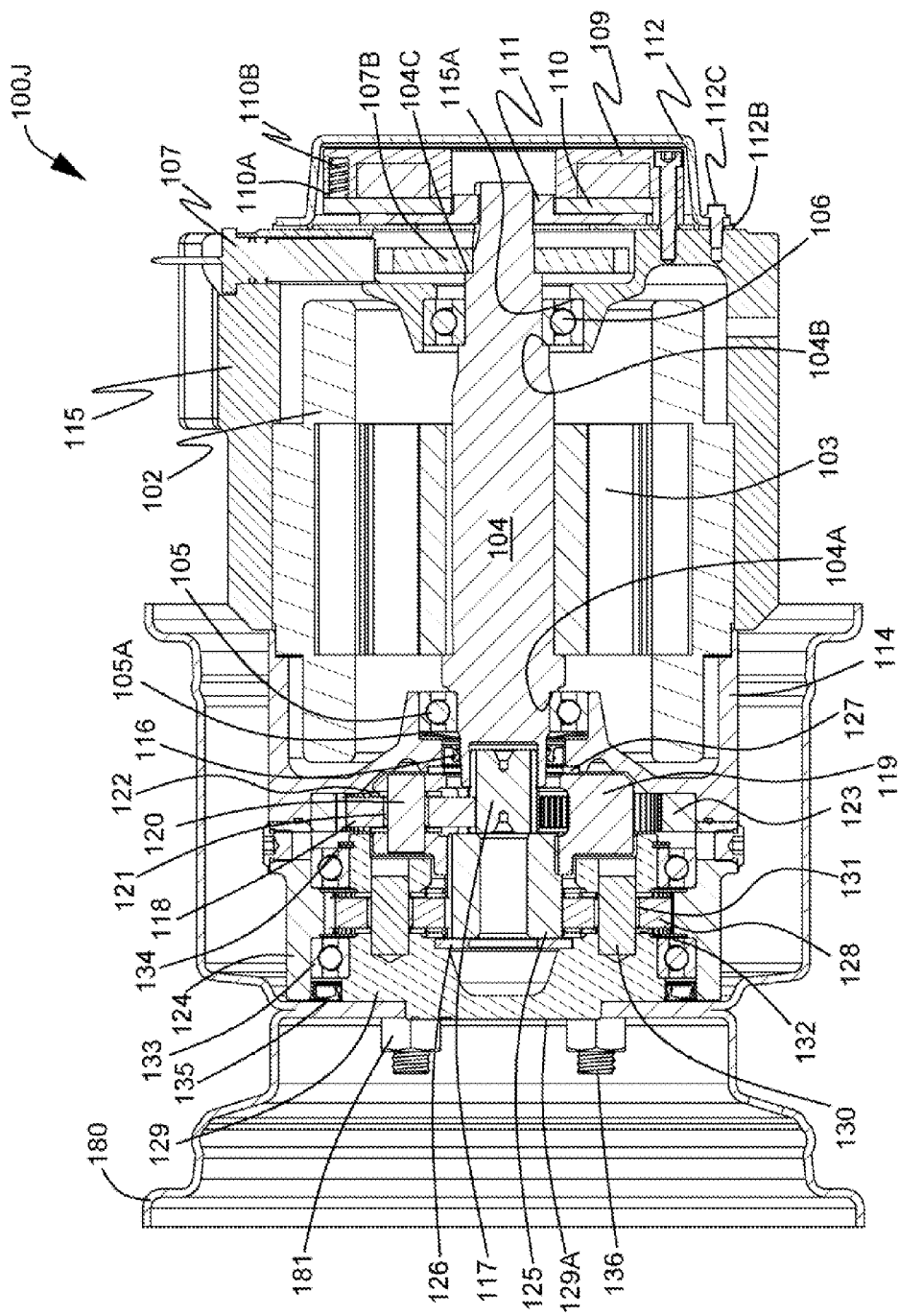
FIG. 1J is a cross-sectional view similar to FIG. 1B with a wheel hub attached to the integrated spindle-carrier electric wheel drive assembly.

FIG. 1H is an enlargement of a portion 100H of FIG. 1B. FIG. 1I is an enlargement of a portion 100I of FIG. 1H. Referring to FIGS. 1B, 1H, and 1I, speed sensor 107 is shown in proximity to a rotating target (optical, magnetic or hall effect) 107B. Speed sensor 107B is press fit to shaft 104 or it may be keyed to the shaft 104. Brake housing 109, magnet/coil 109A, threaded bolt 109B to affix the brake housing 109 to motor housing 115 are clearly illustrated in FIG. 1H.

Threaded bolt 109D in bore 109C of motor housing 115 secures the brake 109 to the motor housing 115. Brake armature 110 operates against spring 110B in brake 109 urging brake armature plate 110 into engagement with rotating brake disc 111 when electrical power is not supplied to coils 109. Rotating brake disc 111 is splined 150 to shaft 104. Friction disc 111A is used as a backstop for rotating brake disc 111. Frictional surface 111B of the rotating brake disc interengages armature 110 under the force of springs 110B.

Brake cover 112 is affixed to the motor housing 115 by a plurality of bolts 112C threaded 112A into motor housing 115. A brake cover seal 112B is trapped between the brake cover 112 and the motor housing 115.

FIG. 1C is an enlargement of a portion 100C of FIG. 1B illustrating the spindle-carrier 129 subassembly, the input carrier 119, and drive end head 114. Referring to FIGS. 1B and 1C, motor seal 116 prevents leakage of gearbox oil into the motor housing 115.

Shaft 104 includes an internal spline which mates with input sun gear 117 causing input sun gear to rotate therewith. Input sun gear 117 mates with input planet gears 118 mounted in input planet carrier 119. FIG. 1D is a perspective view 100D of the input carrier 119 and the input planet gears 118. Pins 120 and bearings 121 are used to mount input planet gears 118 in the input planet carrier 119. Preferably there are three input planet gears 118. Bearings 121 promote smooth rotation of the input planet gears about the pins 120. Input planet gear washers 122, 122A illustrated in FIGS. 1B and 1C prevent input planet gear collisions with input carrier 119. Input planet gears 118 mesh with input sun gear 117 as indicated by reference numeral 160A. Input planet gears 118 also mesh with input ring gear 123 as indicated by reference numeral 163.

Output sun gear 125 meshes with carrier spline 119 as indicated by reference numeral 162. Similarly, output sun gear 125 meshes with output planet gear 128 as indicated by reference numeral 162A

Input ring gear 123 resides on the inner circumference of the drive end head 114. Drive end head houses input sun gear 117, input planet carrier 119, and input planet gears 118. FIG. 1E is a perspective view 100E of the drive end head 114 sub assembly. Input ring gear 123 may be machined into the drive end head 114 or it may be a separate part which is affixed to the drive end head 114.

Spindle-carrier housing 124 includes an output ring gear 164 as illustrated in FIG. 1F. FIG. 1F is a perspective view 100F of the output ring gear 164A of the fixed spindle-carrier housing 124. Output sun gear 125 is driven by input planet carrier 119 with a splined connection 162 and in turn output sun gear 125 drives output planet gear 128. Preferably there are four output planet gears 128. Each of the output planet gears 128 are supported by output planet gear pins 130 having bearings 131 therearound. Output planet gear washers 132, 132A prevent damage of the output planet gears 128 which would otherwise occur through collisions with the spindle-carrier 129. Thrust washers 126, 127 limit the axial movement of the output sun gear 125 and the input carrier 119. Input carrier face 119A engages thrust washer 127 when the input carrier slides axially toward the motor end of the assembly.

Lip portion 129B of the spindle-carrier housing having bolt holes 129C therethrough are illustrated in FIG. 1F.

FIG. 1G is perspective view 100G of the generally cylindrically shaped 173 spindle-carrier 129. End portion 129A of the generally cylindrically shaped spindle-carrier is illustrated in FIGS. 1 and 1B. Bearings 133, 133A between fixed spindle-carrier housing 124 and spindle-carrier 129 are illustrated in FIG. 1B. Snap-ring 134 (or equivalent) which resides in a circumferential groove 173A in the outer surface of spindle-carrier 129 and shoulder 171 on spindle-carrier housing 124 trap one of the two bearings 133A residing between the spindle-carrier 129 and the fixed spindle-carrier housing 124. The other bearing 133 is trapped between shoulders 170, 172 of the spindle-carrier 129 is illustrated in FIG. 1C.

FIG. 1J is a cross-sectional view 100J similar to FIG. 1B with a wheel hub 180 attached to the integrated spindle-carrier 129 electric wheel drive assembly. Nuts 181 are threaded onto threaded studs 136 securing hub 180 to the spindle-carrier 129 for rotation therewith.

Electrical power is supplied to the motor through terminal block 101 as illustrated in FIG. 1. Terminal strip 101 includes lines 101A, 101B and 101C. An electric motor includes a shaft 104 mounted rotor 103 and a stator 102. An AC induction motor is illustrated schematically, however, any type of electric motor can be used as long as it satisfies the vehicle requirements. Alternating current enters the motor stator windings 102 which create a moving magnetic field which induces a current in the rotor 103 and magnetic field in the rotor 103. Rotor 102 and shaft 104 rotate at a relatively high speed. The motor shown rotates at about 4800 rpm and develops 220 inch pounds of torque.

Motor shaft 104 is supported by motor bearings 105, 106. The electric motor 102, 103 has sensors that provide information on the motor performance back to a motor controller (not shown). A speed sensor 107 and a temperature sensor 108 connector are shown in FIG. 1. Speed sensor 107 may be a magnetic, optical or hall effect sensor 107B used in conjunction with rotating disc 107B. It will be noted that for clarity of presentation, the temperature sensor is not illustrated in FIG. 1B.

On the right hand portion of FIG. 1B, an electric brake 109 is illustrated that will stop the motor shaft 104 so the vehicle can be parked on an incline. Brake 109 is also used for emergency stops. Brake 109 includes a donut-shaped electric coil 109A that is energized through the brake electrical connector 113. Also for the sake of clarity it will be noted that the wiring to energize coil 109A is not illustrated in FIG. 1B. When energized, coil 109B creates a magnetic field which pulls the brake armature plate 110 against springs 110B imbedded in bores 110A in the brake housing 109. This allows for the brake disc 111 which is splined 150 to rotate freely with shaft 104 as illustrated in FIG. 1H. The brake disc 111 may be alternatively connected to the motor shaft 104 via a key, or other type of shaft connection.

The brake assembly is covered with the brake cover 112 to prevent contaminants from affecting the brake performance. Drive head end 114 of the motor connects to the motor housing 115 and provides support for the drive end motor bearing 105 and motor seal 116. Motor seal 116 prevents gearbox oil (not shown) from entering the motor housing. Oil enters the gearbox through oil plugs 195 in the fixed spindle-carrier housing 124 as best illustrated in FIG. 1C.

Internal splines 160 on the drive end of the motor shaft 104 connect to the input sun gear 117. Alternatively, instead of a spline, a key or other connection that transmits rotational power can be used to connect the shaft 104 to the input sun gear 117. Input sun gear 117 meshes with input planet gears 118 to transfer rotational power. Input planet gears 118 are interconnected together with input carrier 119 which includes pins 120 that allow input planet gears 118 to rotate relative to the input carrier 119. Planet gears 118 include bearings 121 for smooth rotation about carrier pins 120. Thrust washers 122, 122A keep the sides of the rotating input planet gears 118 from damaging the input carrier 119 walls. Input planet gears 118 also mesh with fixed input ring gear 123 which is either rigidly attached to the drive head end 114 as a separate ring or it may be directly machined into the drive head end 114. Rotation of input planet gears 118 within the input ring gear 123 imparts rotational power to output sun gear 125 which is directly connected to the input carrier 119 with a spline 162, key or similar connection. Input carrier rotates in the same direction as the input sun gear 117.

Rotational power in the output sun gear 125 is of greater torque and less speed than the rotational power from the motor. This change in torque and speed is a function of the number of gear teeth in the input sun gear 117 and input ring gear 123. While the input carrier 119 rotates, it is not supported radially by bearings and is allowed to float within the input ring gear 123. Forces in the gear meshes impart separating forces which allow input carrier 119 to find its true center which helps to reduce noise generation under load. Input carrier 119 and output sun 125 can float axially as well, but their axial movement is controlled by output sun thrust washer 126 and input carrier thrust washer 127.

In a similar manner to the input sun gear 117, output sun gear 125 meshes with the output planets 128. Output planets 128 mesh with the fixed output ring gear 164A in the fixed spindle-carrier housing 124 and impart rotational power to spindle-carrier 129. The output ring gear 164A may be machined in the spindle-carrier housing 124 or it may be a separate component affixed in the housing 124. Output planets 128 are connected to spindle-carrier 129 with spindle-carrier pins 130, which allow the output planet gears 128 to rotate relative to the spindle-carrier 129. Bearings are used about output planet pins 130 for the purpose of ensuring that output planet gears 128 rotate smoothly. Thrust washers 132, 132A protect the sides of the rotating input planet gears 128 from collision with spindle-carrier 129 walls. In a similar manner to input carrier 119, rotational power of spindle-carrier 129 has greater torque and less speed than output sun gear 125. This change of torque and speed is function of the number of teeth in the output ring of the spindle-housing 124 and output sun gear 125. Spindle-carrier 129 is supported within the output ring of the spindle-carrier housing with ball bearings 133, 133A. Bearings 133, 133A also provide the support for the vehicle wheel loads. Bearings are retained on the spindle-carrier 129 with a retaining ring 134, bearing nut, or similar device. Main seal 135 is pressed into the annular space between the spindle-carrier housing 124 and the spindle-carrier 129 and prevents leakage of gearbox oil. Vehicle wheel 180 is connected directly to the spindle-carrier 129 with wheel studs 136. Wheel studs 136 are strategically placed in the spindle-carrier 129 between the planet gears 128.

Conventional wheel drive gearboxes have a separate spindle part that connects to the output carrier and contains the wheel support bearings, seal, and the wheel mounting features studs, wheel pilot, etc. In the drive of the instant invention, spindle-carrier 129 is used for all of the functions of the typical output carrier and spindle. This dramatically reduces the cost and size of the gearbox. The gearbox is relatively small in diameter which allows for a significant portion of the wheel to surround the electric wheel drive assembly. The electric wheel drive assembly is connected to the vehicle frame with mounting features 137 on the motor housing. These mounting features can be in a variety of configurations depending upon the requirements of the specific vehicle. Wheel loading is carried back through the main bearings into the spindle-carrier housing 124, drive end head 114 of the motor, and into the motor housing 115. Large load bolts 138 tie the spindle-carrier housing 124, the drive end head 114 assembly, and the motor housing 115 together to form a rigid structure for carrying wheel loads.

An example of the speed reduction achievable in this invention is 26.6:1. The first stage reduction (input sun, input planet gears and input carrier) is 6.2:1 and the second stage (output sun, output planet gears and spindle carrier) reduction is 4.3:1. This speed reductions is set forth by way of example only and obviously range considerably. For a two stage planetary gear system, speed reductions ranging from 20:1 to 60:1 are typically achievable.

This electric motor is capable of 220 in-lbs peak torque and around 4800 RPM peak speed. The gearbox peak rating is around 8850 in-lbs.

FIG. 1I is an enlargement of a portion of FIG. 1H illustrating a portion 100H of the brake 109. Inertia Dynamics Incorporated (hereinafter "IDI") manufactures the spring applied-coil energized to release brake described herein. The IDI brake is adapted to be mounted to the shaft 104 through a splined 150 portion of the shaft. Rotating brake disc 111 includes an internal spline which is affixed to an external spline of the shaft 104 through the splined interconnection 150. Friction disc 111A, frictional surface of the rotating brake disc 111B, brake cover 112, bolt attachment device 112A, brake cover seal 112B and brake cover attachment bolts 112C are illustrated in FIGS. 1I and 1L.

Referring to FIGS. 1H and 1I, energized coil 109A in brake 109 attracts ferromagnetic actuating plate/rotating brake disc 111 (sometimes referred to as the clapper) against the force of springs 110B and away from actuating plate/rotating brake disc 111 to permit plate 111 to rotate with motor shaft 104. Reference numeral 110A represents the spring receiving bore and reference numeral 110B represents the spring in brake 109 urging brake armature plate 110 into engagement with brake disc 111. Reference numeral 111B represents the frictional surface of the rotating brake disc 111.

Referring to FIG. 1I, when coil 109A is actuated, plate 111 abuts body 109 of the brake housing and the unnumbered small gap between armature plate 110 and the brake housing 109 is eliminated. Coil 109A is a direct current coil and energy to operate the coil is supplied through brake connector 113 illustrated in FIG. 1. The internal wiring of the coil is not illustrated in any of the drawing views as it is understood to those of skill in the art.

Drive end housing 114 may be made of iron, steel or stainless steel or any other strong durable material. Similarly, the spindle-carrier housing 124 may be made of iron, steel or stainless steel or any other strong durable material. The gears and carriers are preferably made of iron, steel or stainless steel. Alternatively, the gears and/or carriers may be made of a hard and durable plastic.

REFERENCE NUMERALS 100-perspective of the integrated spindle-carrier electric wheel drive assembly
100A-end view of the integrated spindle-carrier electric wheel drive assembly
100B-cross-sectional view of the integrated spindle-carrier electric wheel taken along the lines 1B-1B of FIG. 1A
100C-enlargement of a portion of FIG. 1B illustrating the integrated spindle-carrier subassembly, the input carrier, and drive end head
100D-perspective view of the input carrier and the input planet gears
100E-perspective view of the drive end head sub assembly
100E-perspective view of the output ring gear of the fixed spindle-carrier housing
100G-perspective view of the spindle-carrier 129
100H-enlargement of a portion of FIG. 1B
100I-enlargement of a portion of FIG. 1H
100J-cross-sectional view similar to FIG. 1B with a wheel hub attached to the drive assembly
101-terminal strip
101A-line
101B-line
101C-line
102-stator winding
103-rotor
104-shaft
104A-first shoulder on shaft 104
104B-second shoulder on shaft 104
105-first (gear reducer side) shaft support bearing
105A-Belleville spring operating between drive end head 114 and shaft support bearing 105
106-second (brake side) shaft support bearing intermediate motor housing 115 and shaft 104
107-speed sensor
107A-speed sensor connector
107B-target (magnetic, optical, hall effect)
108-temperature sensor connection
109-brake housing
109A-magnet/coil 109B-threaded bolt to affix brake housing 109 to motor housing 115
109C-bore in brake housing 109
109D-threaded interconnection of bolt 109B in motor housing 115
110-brake armature
110A-spring receiving bore
110B-spring in brake urging brake armature plate into engagement with brake disc
111-rotating brake disc
111A-friction disc
111B-frictional surface of rotating brake disc
112-brake cover
112A-threaded interconnection of bolts 112C and motor 115
112B-brake cover seal
112C-brake cover attachment bolts
113-brake wiring connector
114-drive end head which houses input sun gear 117, input planet carrier 119, input planet gear 118, and output sun gear 125
115-motor housing
116-motor seal
117-input sun gear
118-input planet gear
119-input planet carrier
119A-face of input carrier engaging thrust washer 127
120-pins of input planet gear
121-input planet gear bearing
122-input planet gear washer
122A-input planet gear washer
123-input ring gear
124-spindle-carrier housing
125-output sun gear
126-output sun thrust washer
127-input carrier thrust washer
128-output planet gears, four total
129-generally cylindrically shaped spindle-carrier
129A-end portion of generally cylindrically shaped spindle-carrier
129B-lip portion of housing
129C-bolt holes in spindle-carrier housing
129D-seal between drive end housing 114 and lip portion 129B of spindle-carrier housing 124
130-output planet gear pins
131-bearing for output planet gears 128
132, 132A-thrust washer for output planet gear
133, 133A-bearing between spindle/fixed ring gear 124 and spindle-carrier 129
134-snap-ring
135-seal
136-threaded studs with loctite
137-attachment plate for connection to a pivoting or non-pivoting mechanism
138-bolts interconnecting the spindle-carrier housing 124, drive end head 114, and motor housing 115 together
150-spline on shaft 104 driving rotating brake disc 111
151-press fit (interference fit) of target 160-meshing of input sun gear 117 and interior teeth of shaft 104
160-meshing of the input planet gears 118 and the input sun gear 118
160A-meshing of internal spline of shaft 104 with input sun gear 117
162-meshing of output sun gear 125 and input carrier 119 spline
162A-meshing of output sun gear 118 and output planet gear
163-meshing of input planet gear 118 with input ring gear 123
164-meshing of output planet gear 128 with output ring gear 164A
164A-output ring gear
170-shoulder on interior of fixed spindle-carrier housing
171-shoulder on interior of fixed spindle-carrier housing
172-shoulder on exterior of spindle-carrier 129
173-cylindrical surface of spindle-carrier 129
173A-circumferential groove in outer cylindrical surface 173 of spindle-carrier 129
180-wheel
181-threaded nut
195-lubrication plug The invention has been set forth by way of example. Those skilled in the art will recognize that changes may be made to the invention without departing from the spirit and scope of the claims which are appended hereto.

The invention claimed is:

1. A wheel drive assembly, comprising:
an input sun gear and a motor rotatably driving said input sun gear;
a fixed drive end housing, said fixed drive end housing includes an input ring gear;
an input carrier and a plurality of input planet gears rotatably mounted thereto, said input sun gear driving said plurality of input planet gears, said input planet gears meshing with said input ring gear causing rotation of said input carrier;
an output sun gear driven by said input carrier;
a fixed spindle-carrier housing;
a generally cylindrically shaped spindle-carrier, said generally cylindrically shaped spindle-carrier residing within said fixed spindle-carrier housing, said fixed spindle-carrier housing includes an output ring gear;
a plurality of output planet gears rotatably mounted in said spindle-carrier, said output sun gear driving said plurality of output planet gears, said output planet gears meshing with said output ring gear causing rotation of said generally cylindrically shaped spindle-carrier;
a wheel; and,
said wheel affixed to said generally cylindrically shaped spindle-carrier and rotatable therewith.

2. A wheel drive assembly as claimed in claim 1 further comprising bearings, said bearings reside between said generally cylindrically shaped spindle-carrier and said fixed spindle-carrier housing.

3. A wheel drive assembly as claimed in claim 1 wherein said wheel includes a hole therein and said generally cylindrically shaped spindle-carrier includes a closed end, said closed end includes a stud for insertion through said hole in said wheel for attachment of said wheel to said closed end of said generally cylindrically shaped spindle-carrier.

4. A wheel drive assembly as claimed in claim 3 wherein said stud includes threads thereon and further comprising a nut threaded on said stud securing said wheel to said closed end of said generally cylindrically shaped spindle-carrier.

5. A wheel drive assembly as claimed in claim 1 further comprising a motor shaft, said motor shaft includes an internal spline and said input sun gear includes teeth which mesh with said internal spline of said motor shaft, said input planet gears mesh with said input sun gear and said input ring gear allowing said input carrier to move radially and adjustably locate a true rotating center thus reducing noise generation under load.

6. A wheel drive assembly as claimed in claim 1 wherein said motor is an electric motor.

7. A wheel drive assembly as claimed in claim 1 further comprising a brake.

8. A wheel drive assembly as claimed in claim 1 further comprising a motor shaft, said motor shaft includes an internal spline and said input sun gear includes teeth which mesh with said internal spline.

9. A wheel drive assembly as claimed in claim 1 wherein said input planet carrier resides partially within said spindle-carrier.

10. A wheel drive assembly as claimed in claim 1 further comprising first and second bearings, said spindle carrier being generally cylindrically shaped, said generally cylindrically shaped spindle carrier has an exterior, said first and second bearings interposed between said exterior of said generally cylindrically shaped spindle-carrier and said fixed spindle-carrier housing.

11. A wheel drive assembly as claimed in claim 1 further comprising a stud, said stud affixed to said spindle carrier and extending therefrom, a wheel, said stud affixed to said wheel.

12. A wheel drive assembly, comprising:
an electric motor rotatably driving an input sun gear;
a fixed drive end housing, said fixed drive end housing includes an input ring gear;
an input carrier and a plurality of input planet gears rotatably mounted in said input carrier, said input sun gear driving and meshing with said plurality of input planet gears, said input planet gears meshing with said input ring gear of said input carrier causing rotation of said input carrier about its true center, said input ring gear allowing said input carrier to move radially and reduce noise generation under load;
an output sun gear driven by said input carrier;
a fixed spindle-carrier housing, said fixed spindle-carrier housing includes an output ring gear;
a spindle-carrier and a plurality of output planet gears rotatably mounted in said spindle-carrier, said output sun gear driving said plurality of output planet gears, said output planet gears meshing with said output ring gear of said spindle-carrier housing causing rotation of said spindle-carrier;
said input planet carrier resides partially within said spindle-carrier;
a wheel; and, said wheel affixed to said spindle-carrier and rotatable therewith.

13. A wheel drive assembly as claimed in claim 12 further comprising first and second bearings, said spindle carrier being generally cylindrically shaped, said generally cylindrically shaped spindle carrier has an exterior, said first and second bearings interposed between said exterior of said generally cylindrically shaped spindle-carrier and said fixed spindle-carrier housing.

14. A wheel drive assembly as claimed in claim 12 further comprising a stud, said stud affixed to said spindle carrier and extending therefrom, a wheel, said stud affixed to said wheel.

15. A wheel drive assembly as claimed in claim 12 further comprising a motor shaft, said motor shaft includes an internal spline and said input sun gear includes teeth which mesh with said internal spline.

16. A wheel drive assembly, comprising:
a spindle-carrier and a wheel, said wheel being affixed to said spindle-carrier;
a fixed spindle-carrier housing, said spindle-carrier housing includes an output ring gear;
said spindle-carrier is generally cylindrically shaped and resides within said spindle-carrier housing;
output planetary gears;
an output sun gear, said output sun gear interengaging and driving said output planetary gears; and,
said output planetary gears interengaging said output ring gear of said fixed spindle-carrier housing driving and rotating said spindle-carrier and said wheel therewith.

17. A wheel drive assembly as claimed in claim 16, further comprising:
a fixed drive end housing, said fixed drive end housing includes an input ring gear;
an input carrier and a plurality of input planet gears rotatably mounted in said input carrier;
an input sun gear, said input sun gear driving and meshing with said plurality of input planet gears, said input planet gears meshing with said input ring gear of said fixed drive end housing causing rotation of said input carrier about its true center, said input ring gear allowing said input carrier to move radially and reduce noise generation under load; and,
said output sun gear driven by said input carrier.

18. A wheel drive assembly as claimed in claim 17 wherein said input carrier is partially nested within said spindle-carrier.

19. A wheel drive assembly as claimed in claim 18 further comprising a motor housing and wherein an electric motor resides partially within said fixed drive end housing and said motor housing, said electric motor rotatably drives an input sun gear.

20. A wheel drive assembly as claimed in claim 19 further comprising a motor shaft, said motor shaft includes an internal spline and said input sun gear includes teeth which mesh with said internal spline.

21. A wheel drive assembly as claimed in claim 19 wherein:
said generally cylindrically shaped spindle-carrier includes a closed drive end and a partially open input end, said input carrier is partially nested within said partially open input end of said spindle-carrier; and,
said fixed spindle-carrier housing is generally cylindrically shaped.

22. A wheel drive assembly as claimed in claim 19 wherein:
said housing includes a lip having bolt holes therethrough;
said fixed end drive housing includes bolt holes therethrough;
said motor housing includes threaded bolt holes therein; and,
a plurality of bolts reside respectively in said bolt holes of said housing and said fixed end drive housing and said threaded bolt holes of said motor housing.

23. A wheel drive assembly, comprising:
a spindle-carrier, said spindle carrier being generally cylindrically shaped, said generally cylindrically shaped spindle carrier has an exterior;
a wheel, said wheel being affixed to said generally cylindrically shaped spindle-carrier;
a fixed spindle-carrier housing, said spindle-carrier residing within said spindle-carrier housing, said spindle-carrier being rotatable and said wheel rotating therewith;
a fixed drive end housing;
a motor housing;
an input carrier residing partially within said fixed drive end housing and partially within said spindle-carrier, said input carrier being self-centering;
first and second bearings, said first and second bearings interposed between said exterior of said generally cylindrically shaped spindle-carrier and said fixed spindle-carrier housing; and,
a motor residing partially within said motor housing and partially within said fixed drive end housing.

24. A spindle-carrier in combination with a fixed spindle-carrier housing, comprising:
- said spindle-carrier being generally cylindrically shaped and residing within said fixed spindle-carrier housing; and,
- a bearing, said bearing resides within said fixed spindle-carrier housing and intermediate said generally cylindrically-shaped spindle-carrier and said fixed spindle-carrier housing permitting rotation of said spindle-carrier with respect to and within said fixed spindle-carrier housing.

25. A spindle-carrier in combination with a fixed spindle-carrier housing as claimed in claim 24, wherein:
- said fixed spindle-carrier housing includes an internal output ring gear;
- said generally cylindrically-shaped spindle-carrier includes a closed end portion and a partially open end portion;
- a plurality of planet gears rotatably mounted in said generally cylindrically-shaped spindle-carrier;
- a sun gear, said sun gear resides partially in said partially open end portion of said generally cylindrically-shaped spindle-carrier;
- said sun gear driving said plurality of planet gears;
- said planet gears rotatably mounted in said spindle-carrier meshing with said output ring gear of said fixed spindle-carrier housing causing rotation of said spindle-carrier with respect to said fixed spindle-carrier housing driving a wheel of a vehicle.

26. A wheel drive assembly, comprising:
- an input sun gear and a motor rotatably driving said input sun gear;
- a fixed drive end housing;
- said fixed drive end housing includes an input ring gear;
- an input carrier;
- a fixed spindle carrier housing;
- a spindle-carrier;
- said spindle-carrier residing within said fixed spindle-carrier housing;
- said fixed spindle-carrier housing includes an output ring gear;
- a plurality of output planet gears rotatably mounted in said spindle-carrier;
- an output sun gear;
- said output sun gear driving said plurality of output planet gears;
- said output planet gears meshing with said output ring gear causing rotation of said spindle-carrier;
- a wheel;
- said wheel affixed to said spindle-carrier and rotatable therewith;
- said input carrier resides partially within said drive end housing and partially within said spindle-carrier;
- said input carrier includes a plurality of input planet gears rotatably mounted thereto;
- said input sun gear driving and meshing with said plurality of input planet gears;
- said input planet gears meshing with said input ring gear causing rotation of said input carrier;
- said input planet gears and said input carrier float and move radially and adjustably locating a true rotating center; and,
- said output sun gear is in meshing engagement with said input carrier.

27. A wheel drive assembly as claimed in claim 26 further comprising a motor shaft, said motor shaft includes an internal spline and said input sun gear includes teeth which mesh with said internal spline.

28. A wheel drive assembly as claimed in claim 26, further comprising
- said spindle-carrier being generally cylindrically shaped and residing within said fixed spindle-carrier housing;
- a bearing, said bearing resides intermediate said generally cylindrically-shaped spindle carrier and said fixed spindle-carrier housing permitting rotation of said spindle-carrier with respect to said fixed spindle-carrier housing;
- said generally cylindrically-shaped spindle-carrier includes a closed end portion and a partially open end portion;
- said output planet gears rotatably mounted in said generally cylindrically-shaped spindle-carrier;
- said output sun gear resides partially in said partially open end portion of said generally cylindrically-shaped spindle carrier;
- said floating input carrier meshing and in overlapping engagement with said output sun gear and driving said output sun gear;
- said output sun gear driving said plurality of output planet gears; and,
- said output planet gears rotatably mounted in said cylindrically-shaped spindle carrier meshing with said output ring gear of said fixed spindle-carrier housing causing rotation of said spindle-carrier with respect to said fixed spindle-carrier housing driving a wheel of a vehicle.

29. A wheel drive assembly, comprising:
- an input sun gear and a motor rotatably driving said input sun gear;
- a fixed drive end housing, said fixed drive end housing includes an input ring gear;
- an input carrier and a plurality of input planet gears rotatably mounted thereto, said input sun gear driving said plurality of input planet gears, said input planet gears meshing with said input ring gear causing rotation of said input carrier;
- an output sun gear driven by said input carrier;
- a fixed spindle-carrier housing;
- a generally cylindrically shaped spindle-carrier, said generally cylindrically shaped spindle-carrier residing within said fixed spindle-carrier housing, said fixed spindle-carrier housing includes an output ring gear;
- a plurality of output planet gears rotatably mounted in said spindle-carrier, said output sun gear driving said plurality of output planet gears, said output planet gears meshing with said output ring gear causing rotation of said generally cylindrically shaped spindle-carrier;
- said output ring gear includes a first side and a second side;
- first and second bearings, said first bearing interposed between said spindle carrier and said fixed spindle-carrier housing adjacent said first side of said output ring gear;
- said second bearing interposed between said spindle carrier and said fixed spindle-carrier housing adjacent said second side of said output ring gear;
- a wheel; and,
- said wheel affixed to said generally cylindrically shaped spindle-carrier and rotatable therewith.

30. A wheel drive assembly, as claimed in claim 29, further comprising: said input planet gears mesh with said input sun gear and said input ring gear allowing said input carrier to move radially and adjustably locate a true rotating center thus reducing noise generation under load.

* * * * *

UNITED STATES PATENT AND TRADEMARK OFFICE
CERTIFICATE OF CORRECTION

PATENT NO. : 8,323,143 B2
APPLICATION NO. : 12/629204
DATED : December 4, 2012
INVENTOR(S) : Benjamin Warren Schoon Page 1 of 1

It is certified that error appears in the above-identified patent and that said Letters Patent is hereby corrected as shown below:

Col. 8, line 41, delete "100E" and insert -- 100F -- therefor.

Signed and Sealed this
Twelfth Day of February, 2013

Teresa Stanek Rea
*Acting Director of the United States Patent and Trademark Office*